No. 740,950. PATENTED OCT. 6, 1903.
J. H. TRISMEN.
BICYCLE GEAR.
APPLICATION FILED MAR. 3, 1903.
NO MODEL.
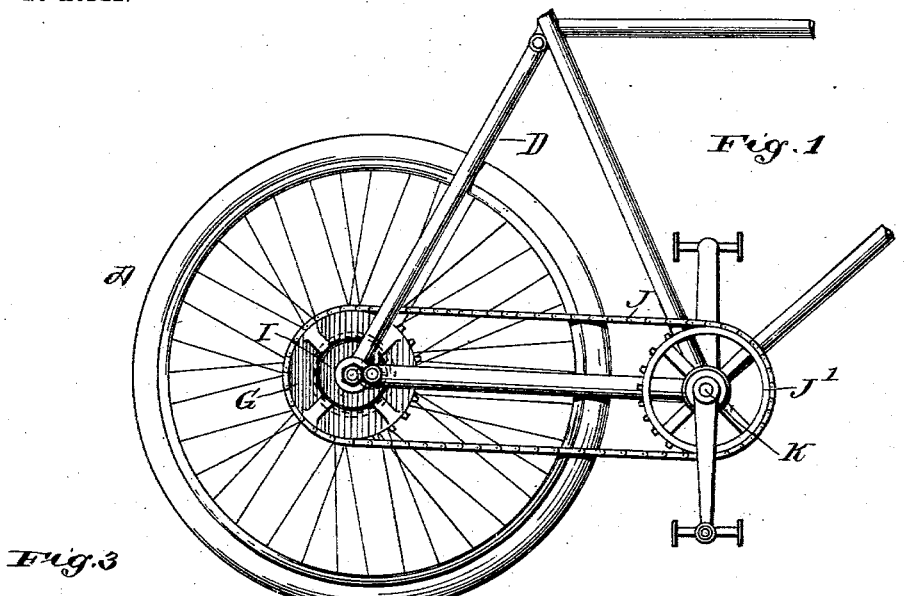
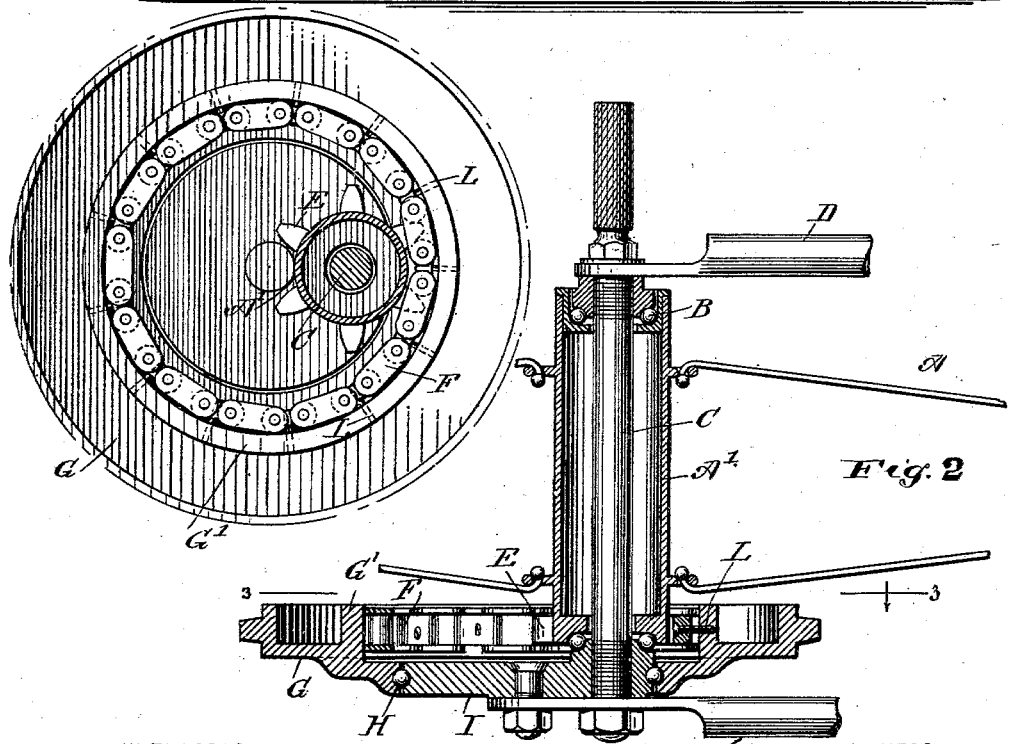
WITNESSES:
INVENTOR
John H. Trismen
BY
ATTORNEYS.

No. 740,950.

Patented October 6, 1903.

UNITED STATES PATENT OFFICE.

JOHN HENRY TRISMEN, OF NEW YORK, N. Y.

BICYCLE-GEAR.

SPECIFICATION forming part of Letters Patent No. 740,950, dated October 6, 1903.

Application filed March 3, 1903. Serial No. 146,922. (No model.)

*To all whom it may concern:*

Be it known that I, JOHN HENRY TRISMEN, a citizen of the United States, and a resident of the city of New York, (Port Richmond, borough of Richmond,) in the county of Richmond and State of New York, have invented a new and Improved Bicycle-Gear, of which the following is a full, clear, and exact description.

The object of the invention is to provide a new and improved bicycle-gear more especially designed for transmitting the motion of the sprocket-chain to the rear or driving wheel of the bicycle in an economical manner, at the same time insuring a high speed to the bicycle and utilizing the power exerted by the rider or motor to the fullest advantage.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement as applied. Fig. 2 is an enlarged sectional plan view of the improvement, and Fig. 3 is a sectional rear side elevation of the same on the line 3 3 of Fig. 2.

The hub A' of the rear or driving wheel A of a bicycle is journaled on suitable ball-bearings B, supported from a rear axle C, held in the usual manner on the frame D of the bicycle. On one end of the hub A' is formed or secured a sprocket-pinion E in mesh with an endless internal sprocket-chain F, secured to the inner face of a rim G', formed on a sprocket-wheel G, mounted to turn on a ball-bearing H, held on a disk I, secured on the bicycle-frame D, and also engaged by the axle C, as plainly shown in Fig. 2. Over the sprocket-wheel G passes the usual bicycle-chain J, also passing over a sprocket-wheel J', held on the crank-axle K of the bicycle, so that when the crank-axle is turned the sprocket-wheel J' and chain J impart a rotary motion to the sprocket-wheel G, which by the sprocket-chain F rotates the sprocket-pinion E, and consequently the rear or driving wheel A.

As indicated in Fig. 3, the endless sprocket-chain wheel F has it blocks secured by bolts or other means L to the rim G', it being understood that the said sprocket-chain wheel forms an internal wheel for rotating the pinion E to drive the rear or driving wheel A, as above described.

By the arrangement described the traveling motion of the sprocket-chain J is readily converted into rotary motion, and at the same time a high speed is given to the rear or driving wheel A, and the power exerted by the rider on the pedals of the crank-shaft K is transmitted to the fullest advantage.

It is understood that I do not limit myself to the pedal mechanism shown, as the device may be equally well used on motor-bicycles and other machines.

Having thus described my invention, I claim as new and desire to secure by Letters Patent—

1. In a driving-gear for bicycles, the combination with the axle, and a wheel-hub, of a sprocket-pinion on one end of the hub, a fixed eccentric disk, engaged by the axle, a sprocket-wheel mounted to turn on the said disk and having an annular rim, and a sprocket-chain fixedly secured to the inner face of the rim of the sprocket-wheel, and with which the said pinion engages, as set forth.

2. A driving-gear, comprising a gear-wheel, an endless sprocket-chain fixedly secured to the said gear-wheel, and a sprocket-pinion on the part to be driven and meshing with said endless sprocket-chain, as set forth.

3. A driving-gear for bicycles, comprising a wheel to be driven, a sprocket-pinion on the hub of the said wheel, an endless sprocket-chain in mesh with the said sprocket-pinion, and a driven sprocket-wheel to the inner face of which the said endless sprocket-chain is fixedly secured, as set forth.

4. A driving-gear for bicycles, comprising a sprocket-chain, a sprocket-wheel engaged by the said sprocket-chain and formed with an annular rim, an endless sprocket-chain having its blocks secured to the said rim at the inner face thereof, a sprocket-pinion in mesh with the said endless sprocket-chain, and a driven wheel carrying on its hub the said sprocket-pinion, as set forth.

In testimony whereof I have signed my name to this specification in the presence of two subscribing witnesses.

JOHN HENRY TRISMEN.

Witnesses:
HENRY S. SEAWOOD,
FREDERICK TRISMEN.